(12) United States Patent
Kobayashi et al.

(10) Patent No.: US 12,039,898 B2
(45) Date of Patent: Jul. 16, 2024

(54) IMAGE DISPLAY SYSTEM

(71) Applicant: TOYOTA JIDOSHA KABUSHIKI KAISHA, Aichi-ken (JP)

(72) Inventors: Hideki Kobayashi, Miyoshi (JP); Takayuki Aoki, Toyota (JP); Ryusuke Ohta, Toyota (JP); Hitoshi Muraki, Aichi-ken (JP); Tomohiro Inada, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 74 days.

(21) Appl. No.: 17/990,745

(22) Filed: Nov. 21, 2022

(65) Prior Publication Data

US 2023/0162634 A1  May 25, 2023

(30) Foreign Application Priority Data

Nov. 22, 2021  (JP) .................................. 2021-189147

(51) Int. Cl.
  *G09G 3/00* (2006.01)
  *G01C 21/36* (2006.01)
  *G06T 7/50* (2017.01)
  *G06T 7/73* (2017.01)

(52) U.S. Cl.
  CPC .............. *G09G 3/001* (2013.01); *G06T 7/50* (2017.01); *G06T 7/74* (2017.01); *G01C 21/365* (2013.01); *G06T 2207/30204* (2013.01); *G06T 2207/30268* (2013.01); *G09G 2340/0464* (2013.01); *G09G 2354/00* (2013.01); *G09G 2380/10* (2013.01)

(58) Field of Classification Search
  None
  See application file for complete search history.

(56) References Cited

U.S. PATENT DOCUMENTS

| | | | |
|---|---|---|---|
| 2015/0294505 A1 | 10/2015 | Atsmon | |
| 2016/0355133 A1* | 12/2016 | Kim | ..................... G06F 3/04883 |
| 2018/0370365 A1* | 12/2018 | Lee | ......................... G06F 3/0487 |
| 2020/0152156 A1* | 5/2020 | Ding | ....................... G09G 5/377 |
| 2021/0035447 A1* | 2/2021 | Urano | ............... G08G 1/096855 |

(Continued)

FOREIGN PATENT DOCUMENTS

| | | |
|---|---|---|
| JP | 2003-030628 A | 1/2003 |
| JP | 2015-204616 A | 11/2015 |

(Continued)

*Primary Examiner* — Nurun Flora
(74) *Attorney, Agent, or Firm* — HAUPTMAN HAM, LLP (57) ABSTRACT

In AR glasses, an incident angle calculation unit calculates first and second angles of incidence of first and second markers, respectively, to an imager relative to a reference line in the real world in accordance with image plane coordinates of the first and second markers in the image captured by the imager. A separation distance calculation unit calculates a camera-to-marker distance, which is a distance from the imager to the first marker, in accordance with the calculated first and second angles of incidence, and an inter-marker separation distance between the first and second markers along the reference line in the real world. A display adjustment unit adjusts a projection position and size of the AR image with respect to the first marker in the image plane coordinates in accordance with the camera-to-marker distance.

5 Claims, 11 Drawing Sheets

(56) References Cited

U.S. PATENT DOCUMENTS

| | | | |
|---|---|---|---|
| 2021/0118192 A1 | 4/2021 | Sato et al. | |
| 2021/0295068 A1* | 9/2021 | Bergt | G06N 3/08 |
| 2021/0397859 A1* | 12/2021 | Arora | G06V 40/19 |
| 2022/0363278 A1* | 11/2022 | Chen | G06V 10/245 |

FOREIGN PATENT DOCUMENTS

| | | |
|---|---|---|
| JP | 2017129406 A | 7/2017 |
| JP | 202164906 A | 4/2021 |

* cited by examiner

IMAGE DISPLAY SYSTEM

CROSS REFERENCE TO RELATED APPLICATION

This application claims priority to Japanese Patent Application No. 2021-189147, filed on Nov. 22, 2021, which is incorporated herein by reference in its entirety including the specification, claims, drawings, and abstract.

TECHNICAL FIELD

A display system for displaying augmented reality (AR) images is disclosed herein.

BACKGROUND ART

Image display systems using augmented reality technology have been known. For example, in JP 2021-64906 A, a driver wears a type of wearable device called smart glasses. The smart glasses are equipped with a camera and a display. The image captured by the camera is recognized, and interior parts in the vehicle cabin are recognized in the image. In addition, among the recognized interior parts, images that are not directly related to the driving operation, such as the color and pattern of the pillars and roof, are displayed (superimposed) on the display.

Also, in JP 2017-129406 A, the image of an AR pacesetter, which is a character used to provide directions, is projected onto the display of the smart glasses. To define the projection position of this AR pacesetter, a prism-shaped marker is placed on the dashboard. By recognizing the image of this marker, the projection position of the AR pacesetter can be determined in accordance with the marker.

When the AR image is projected in accordance with the marker, the projected state of the AR image may be defective, such as a portion of the AR image overlapping the A-pillar depending on the posture and position of the driver wearing the wearable device.

In view of the above, this specification discloses an image display system capable of improving the accuracy of setting the projection position and size of an AR image.

SUMMARY

This specification discloses an image display system. The image display system includes AR glasses, a control unit, and markers. The AR glasses include an imager that captures an image along the line of sight of a driver who is a wearer, a projector that projects an AR image, and a half mirror onto which the AR image is projected. The control unit determines a projection position and size of the AR image onto the half mirror in accordance with the image captured by the imager. The markers are provided in a vehicle cabin. The markers include a first marker and a second marker provided on an exposed interior surface in front of the vehicle cabin and spaced apart from each other along a predetermined reference line. The control unit includes an incident angle calculation unit, a separation distance calculation unit, and a display adjustment unit. The incident angle calculation unit calculates a first angle of incidence, which is the angle of incidence of the first marker to the imager relative to the reference line in the real world, and a second angle of incidence, which is the angle of incidence of the second marker to the imager relative to the reference line in the real world, in accordance with image plane coordinates of the first marker and the second marker in the image taken by the imager. The separation distance calculation unit calculates a camera-to-marker distance, which is a distance from the imager to the first marker, in accordance with the calculated first and second angles of incidence, and an inter-marker separation distance between the first marker and the second marker along the reference line in the real world. The display adjustment unit adjusts the projection position and size of the AR image with respect to the first marker in the image plane coordinates in accordance with the camera-to-marker distance.

According to the above structure, the camera-to-marker distance is determined by the triangulation method using the first angle of incidence, the second angle of incidence, and the inter-marker distance between the markers. Furthermore, the projection position and size of the AR image are determined in accordance with the camera-to-marker distance.

In the above structure, the first and second markers may be luminescent members.

According to the above structure, the markers can be reliably discriminated from each other.

In the above structure, the first and second markers may differ in shape from each other.

According to the above structure, the first marker and the second marker can be discriminated reliably from each other.

In the above structure, the first marker and the second markers may be arranged in the center of the width direction and in the front-rear direction of the vehicle on an exposed surface of the instrument panel.

When using the triangulation method, it is not possible to form a triangle in a case where both the first and second markers are arranged on the optical axis of the camera, and this makes it difficult to determine the camera-to-marker distance. The triangle used in the triangulation method can be formed accurately by arranging the first and second markers within and off-center of the field of view of the driver. In addition, by arranging the first and second markers in the center of the width direction and in the front-rear direction of the vehicle, the markers are seen as indicating the direction of travel, thus suppressing discomfort in appearance.

In the above structure, the first marker may be positioned further forward of the vehicle than the second marker. In addition, the area of the first marker may be less than or equal to the area of the second marker.

According to the above structure, the first marker is more distantly separated from the driver than is the second marker. Therefore, in performing image recognition for the first marker, the size of the first marker may be set larger than the second marker. On the other hand, since the first and second markers are provided on the instrument panel in the front-rear direction of the vehicle, the forward marker having the area larger than the rear marker may cause discomfort to the driver in view of its effect of indicating the direction of travel. By making the area of the first marker less than or equal to the area of the second marker, as in the above structure, it is possible to suppress the feeling of discomfort of the driver.

The image display system disclosed herein enables improved accuracy of setting the projection position and size of the AR image.

DESCRIPTION OF EMBODIMENTS

An embodiment of an image display system is described below with reference to the accompanying drawings. The shapes, materials, number of pieces, and numerical values described below are examples for illustrative purposes, and can be changed as necessary according to the specifications of the image display system. In addition, in the following, the same reference signs are assigned to equivalent elements in all drawings.

Figure 1:
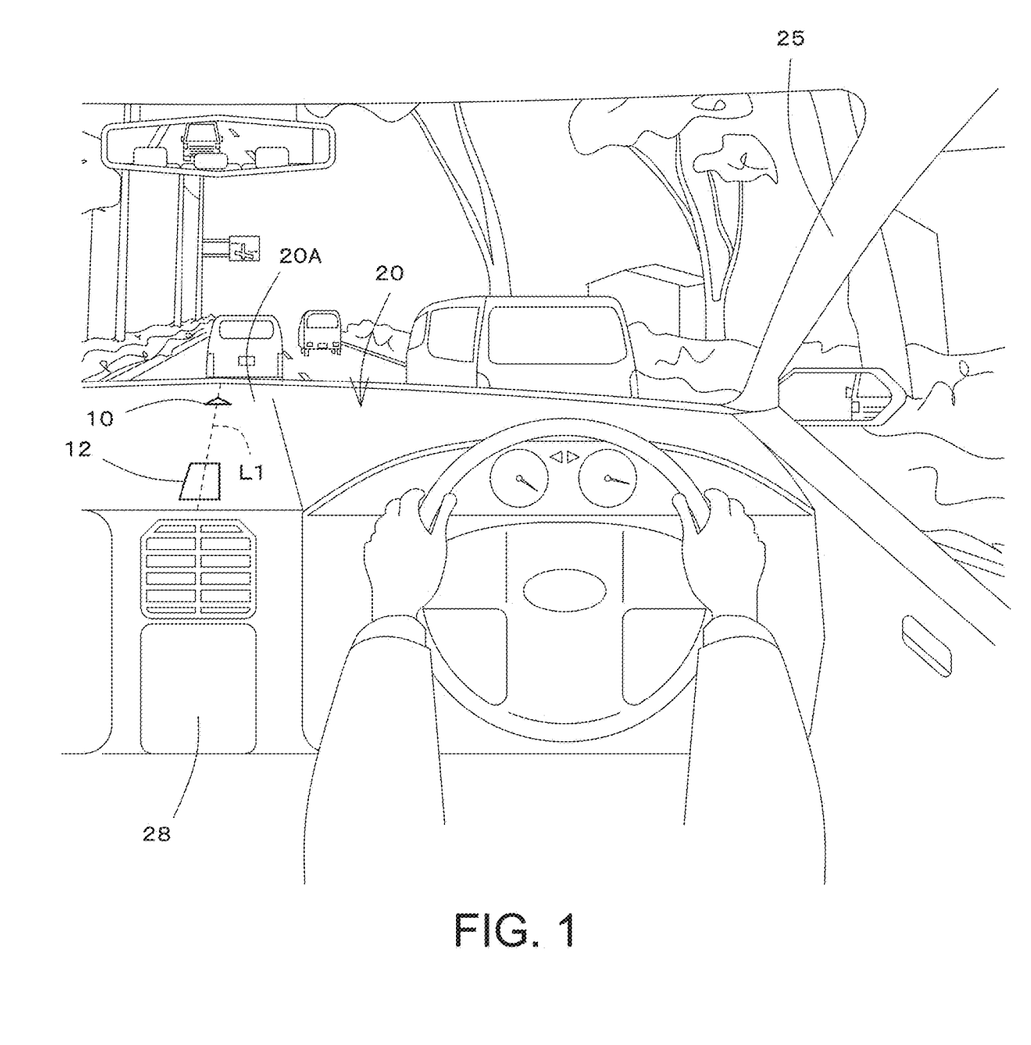
FIG. 1 is a perspective view illustrating the field of view of a driver.

FIG. 1 illustrates the field of view of a driver of a vehicle. In the embodiment illustrated in FIGS. 1 to 11, an example of left-hand traffic with a right-hand drive vehicle is illustrated. However, the image display system according to the present embodiment is also applicable to the case of a left-hand drive vehicle and right-hand traffic.

Figure 3:
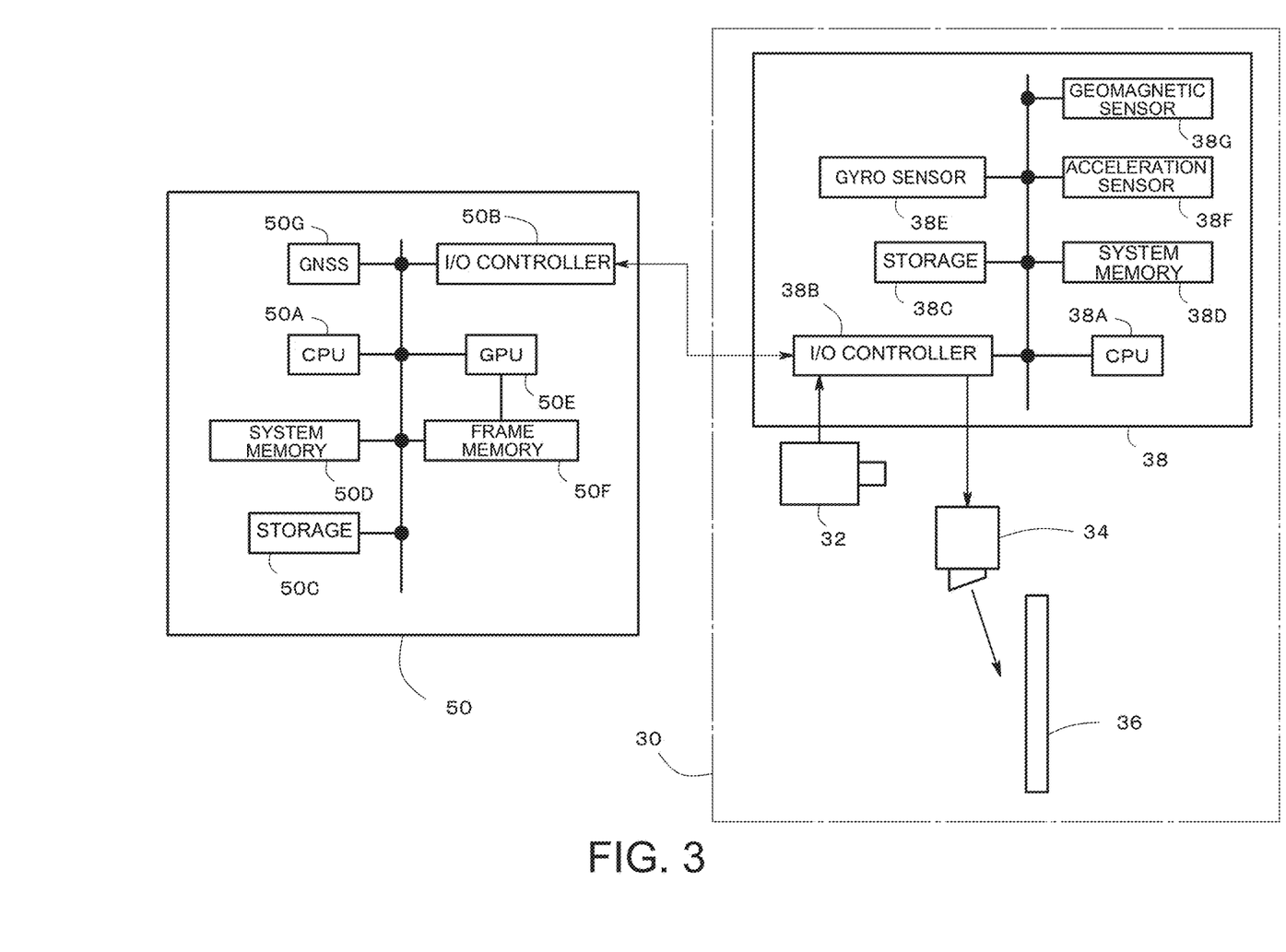
FIG. 3 illustrates a hardware configuration of an image display system according to an embodiment.

As shown in FIGS. 1 and 3, the image display system according to the present embodiment includes AR glasses 30, a driving assistance electronic control unit (ECU) 50, a first marker 10, and a second marker 12.

Figure 2:
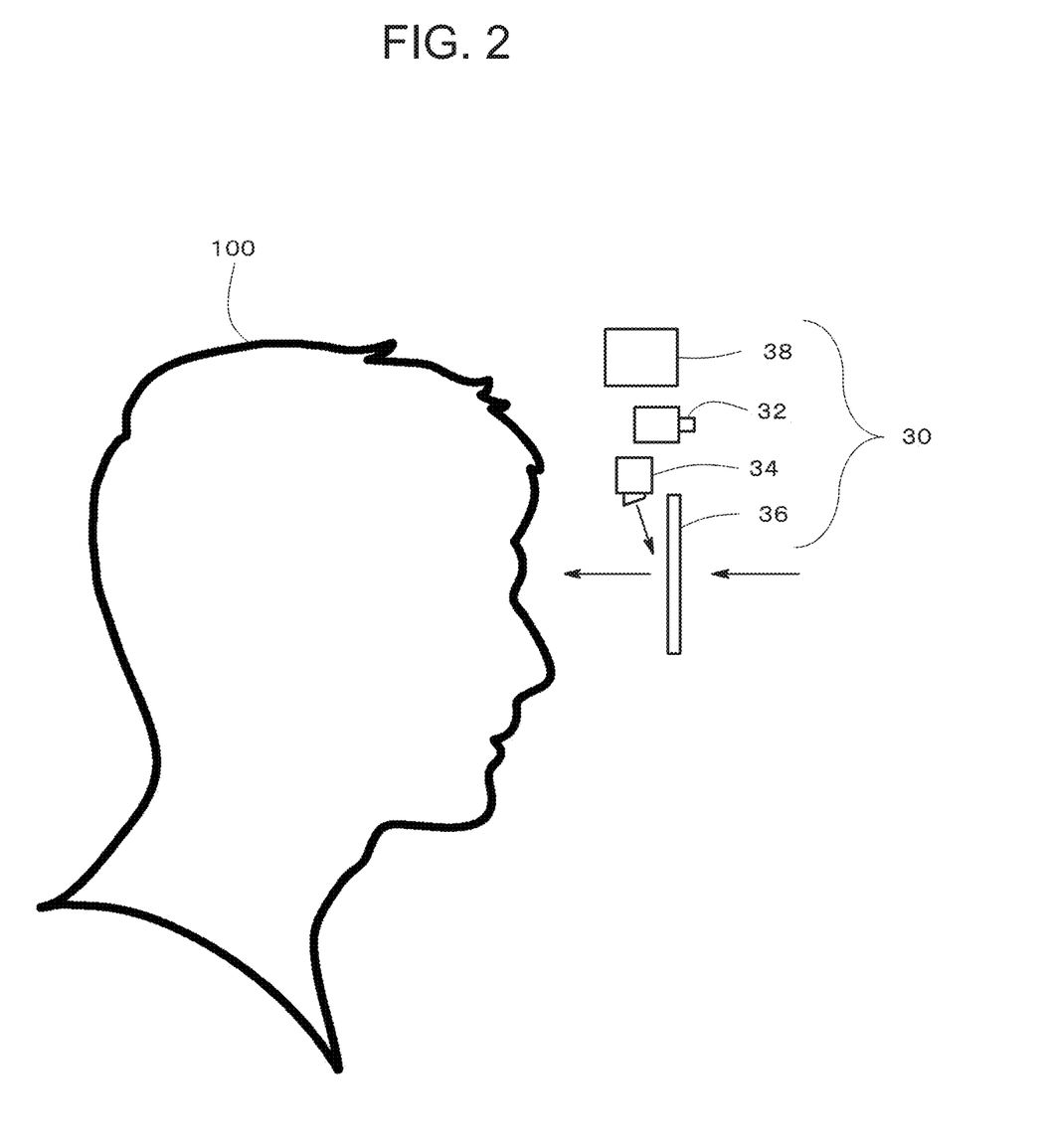
FIG. 2 is a view for explaining AR glasses.
Figure 11:
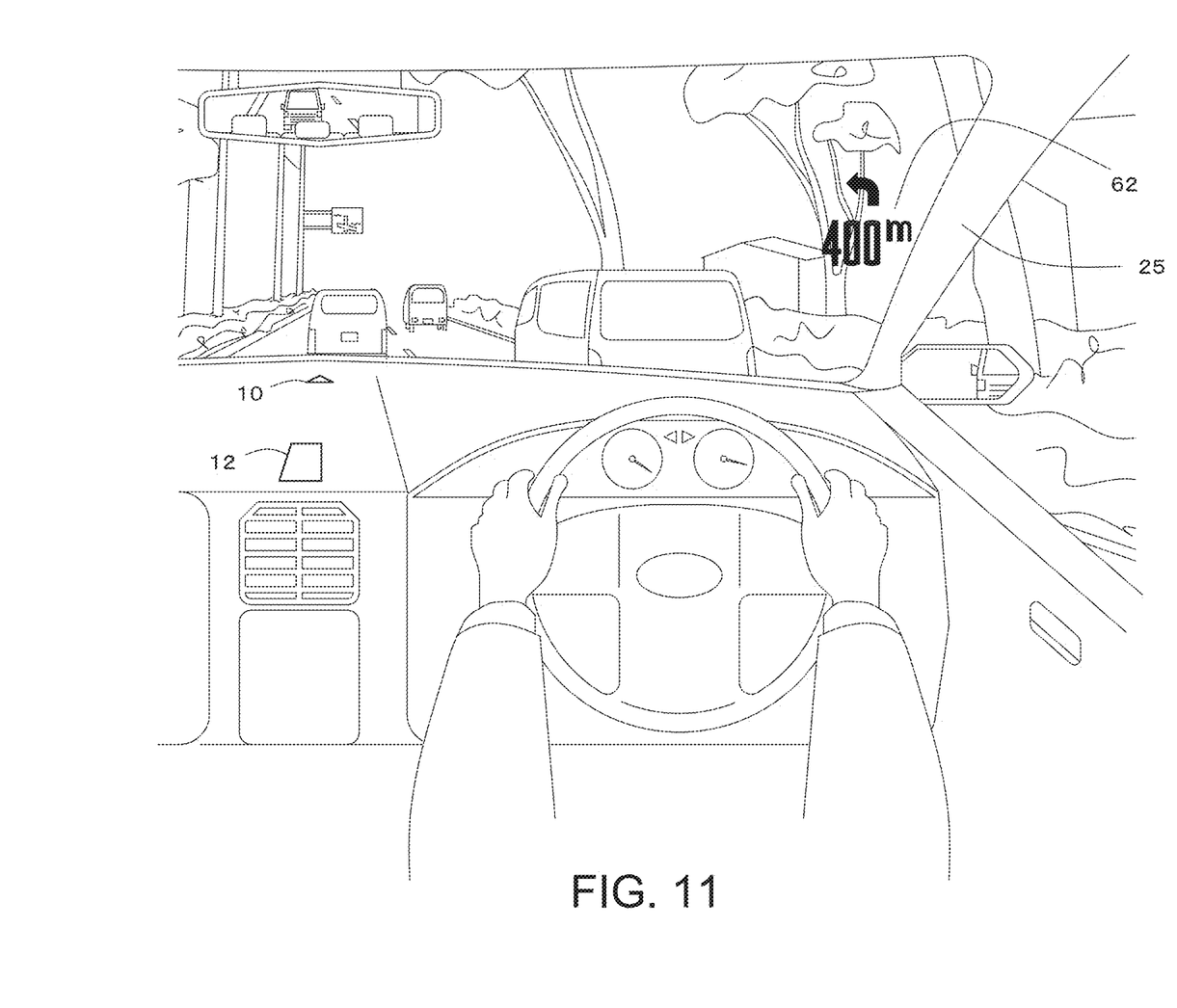
FIG. 11 is a perspective view illustrating the field of view of a driver when the AR image is displayed on the AR glasses.

As illustrated in FIG. 2, the driver 100 wears the AR glasses 30 provided as an eyeglass-shaped wearable terminal. When the AR glasses 30 are worn and desired driving assistance service is enabled (ON state), an AR image 62 is displayed for driving assistance, as illustrated in FIG. 11, in the view of the driver 100.

As will be described later, the AR image 62 is projected onto a half mirror 36 of the AR glasses 30. For the projection onto the half mirror 36, a camera-to-marker distance D1 is determined by the triangulation method (see FIG. 9) using the first marker 10 and the second marker 12 (see FIG. 1). In accordance with the camera-to-marker distance D1, the position and size of an image display frame 60 is determined (see FIG. 10). Furthermore, the AR image 62 like the one illustrated in FIG. 11 is projected onto the half mirror 36 of the AR glasses 30 within the image display frame 60 (see FIG. 2).

<Marker>

As shown in FIG. 1, the markers are provided in the vehicle cabin for projecting the AR image 62. These markers include the first marker 10 and the second marker 12. Both the first marker 10 and the second marker 12 are provided on an interior exposed surface in front of the vehicle cabin. For example, the first marker 10 and the second marker 12 are arranged spaced apart from each other on a top surface 20A, which is an exposed surface of an instrument panel 20, along a predetermined reference line L1.

Here, the reference line L1 needs not be visible to the occupants. For example, a vehicle centerline extending in the center of the vehicle width direction and in the front-rear direction is used as the reference line L1. The vehicle centerline is designed to extend on a horizontal plane. Therefore, for example, the first marker 10 and the second marker 12 are provided on the horizontal surface portion of the top surface 20A of the instrument panel 20.

The first marker 10 and second marker 12 may be flat figures. For example, the first marker 10 and the second marker 12 may be patterns applied on the top surface 20A. Alternatively, the first marker 10 and the second marker 12 may be stickers affixed to the top surface 20A.

The first marker 10 and the second marker 12 may both be luminescent members. For example, the first marker 10 and the second marker 12 may include fluorescent paint. The luminescent first and second markers 10 and 12 can be identified reliably day and night.

The first marker 10 and the second marker 12 may differ in shape. For example, the first marker 10 may be triangular and the second marker 12 may be rectangular. By providing such a difference in shape, the first marker 10 and the second marker 12 can be reliably distinguished from each other.

The first marker 10 and the second marker 12 may be located on the top surface 20A of the instrument panel 20 in the center of the vehicle width direction and in the front-rear direction of the vehicle.

As will be described later, the projection control process of the AR image 62 involves determining a distance between the first marker 10 and an imager 32; that is, the camera-to-marker distance D1 (see FIG. 9) by the triangulation method using the first marker 10, the second marker 12, and the imager 32 of the AR glasses 30 (see FIG. 2). The triangle used in the triangulation method cannot be formed if the first marker 10 and the second marker 12 are arranged on the optical axis L0 of the imager 32.

Therefore, in the present embodiment, the first marker 10 and the second marker 12 are provided at positions within the view of the driver 100, but off-center of the view. This makes it possible to form the triangle used in the triangulation method with high accuracy.

In addition, by arranging the first marker 10 and the second marker 12 in the center of the vehicle width direction and in the front-rear direction of the vehicle, the markers 10 and 12 are visible as if they indicate the direction of travel, thus suppressing discomfort in appearance.

Furthermore, the first marker 10 may be positioned further forward of the vehicle than the second marker 12. In this case, the area of the first marker 10 may be less than or equal to the area of the second marker 12.

As shown in FIG. 1, the first marker 10 is more distantly separated from the driver 100 than is the second marker 12. Therefore, the first marker 10 may be larger in size than the second marker 12 to reliably recognize the first marker 10 during image recognition.

On the other hand, since the first marker 10 and the second marker 12 are provided on the top surface 20A of the instrument panel 20 in the front-rear direction of the vehicle, the forward first marker 10 that is larger than the rear second marker 12 may cause discomfort in the driver 100 in view of the effect of indicating the direction of travel.

Therefore, as illustrated in FIG. 1, by making the area of the first marker 10 less than or equal to the area of the second marker 12, it is possible to suppress the driver 100 from feeling uncomfortable.

<AR Glasses>

FIG. 2 is a schematic diagram of the AR glasses 30 included in the image display system according to the present embodiment. The AR glasses 30 are provided as an eyeglass-shaped wearable terminal that functions as a so-called head-up display (HUD).

As will be described later, the AR image is displayed on the half mirror 36 or the retina of the driver 100 who wears the AR glasses 30. This allows the driver 100 to view the image while looking forward; that is, while keeping his/her head up.

As illustrated in FIG. 3, the AR glasses 30 can communicate with the driving assistance ECU 50 which is an in-vehicle electronic device using, for example, Bluetooth (registered trademark), WiFi (registered trademark), or other wireless communication technologies. Alternatively, the driving assistance ECU 50 and the AR glasses 30 may communicate by wire using a cable or the like.

FIG. 2 is the schematic diagram of the AR glasses 30. The common parts of the eyeglasses, such as temples (side-pieces) and a rim (frame), are omitted from the illustration. The AR glasses 30 include the imager 32, a projector 34, the half mirror 36, and a controller 38.

The imager 32 is provided, for example, on the side of the temple of the AR glasses 30. The imager 32 can capture images along the line of sight of the wearer who is the driver 100. For example, the optical axis of the imager 32 is positioned so that it is parallel to the line of sight when the driver 100 is looking straight ahead.

The imager 32 is, for example, a monocular camera. For example, the imager 32 includes a charge coupled device (CCD) camera or a complementary metal-oxide semiconductor (CMOS) camera in which a pixel array 32A (see FIG. 9) with imaging elements is arranged on a plane. Furthermore, the lens condition of the imager 32 is defined so that the focal length is 50 mm, which is considered to be the closest to the human viewing angle. A lens 32B is, for example, a 50 mm single focal length lens.

The projector 34 projects the AR image. For example, the projector 34 is a micro-projector positioned above the rim of the AR glasses 30. The projector 34 is a so-called transmissive projector that projects the AR image toward the half mirror 36. Alternatively, the projector 34 is a so-called retinal projector that projects the AR image onto the retina of the driver 100. In FIG. 2, the projector 34 is illustrated as a transmissive projector.

The half mirror 36 is the lens portion of the AR glasses 30, through which light (image) from the real world is transmitted to the driver 100. The AR image is also projected onto the half mirror 36 from the projector 34. In this way, the augmented reality image in which the AR image is superimposed on the real-world scenery (real scene) is displayed on the half mirror 36.

The controller 38 is communicable with the driving assistance ECU 50 (see FIG. 3) and also controls the imager 32 and the projector 34. The controller 38 consists of, for example, a computer device, and its hardware configuration includes a central processing unit (CPU) 38A, an input/output (I/O) controller 38B, a storage 38C, a system memory 38D, a gyro sensor 38E, an acceleration sensor 38F, and a geomagnetic sensor 38G. These components are connected to an internal bus.

The I/O controller 38B manages the input/output of information to/from external devices including the imager 32, the projector 34, and the driving assistance ECU 50. The system memory 38D is a storage device used by the operation system (OS) executed by the CPU 38A.

Figure 7:
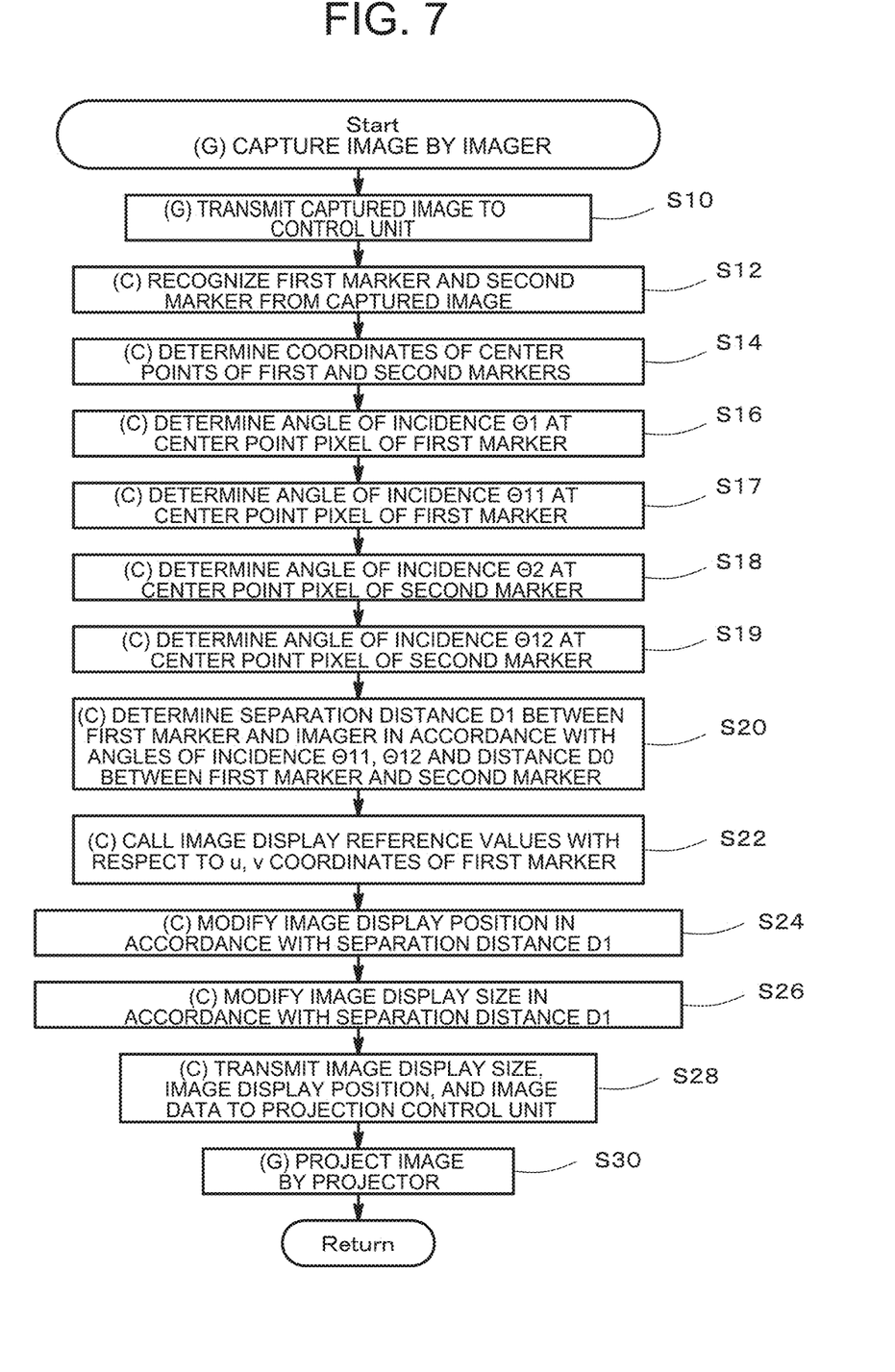
FIG. 7 is a flowchart illustrating the AR image display process.

The storage 38C is an external storage device that stores, for example, programs for executing the initial setting process (see FIG. 5) and the AR image display process (see FIG. 7). The storage 38C consists of, for example, a hard disk drive (HDD) or a solid state drive (SSD).

The acceleration sensor 38F detects the acceleration of gravity. For example, the acceleration sensor 38F detects acceleration of three orthogonal axis components (X, Y, Z). The gyro sensor 38E detects the angular velocity of the AR glasses 30. For example, the gyro sensor 38E detects the angular velocity (roll, pitch, and yaw) of the orthogonal three axis components of the acceleration sensor 38F. The geomagnetic sensor 38G detects the magnetic north direction and the strength of the magnetic force in that direction.

All three of these sensors are attached to the AR glasses 30, and a reference coordinate system (sensor coordinate system) is displaced with respect to the global coordinate system according to the behavior of the head of the wearer who is the driver 100. The detected values of the acceleration sensor 38F and the gyro sensor 38E in accordance with the sensor coordinate system are converted to the acceleration and angular velocity in accordance with the Cartesian coordinate system on the global coordinate system. It is known that this conversion can be performed in a sensor fusion process in accordance with the detection values of the geomagnetic sensor 38G and a Kalman filter.

Sensor fusion is known and will not be described here.

As will be described later, the displacement of the imager 32 from its initial state (see FIG. 9) is determined as the acceleration and angular velocity in accordance with the Cartesian coordinate system on the global coordinate system, and these values are used to calculate angles of incidence $\theta 11$ and $\theta 12$.

In the conversion from the sensor coordinate system to the global coordinate system, the acceleration sensor 38F may detect the acceleration of the vehicle. In this case, as a preprocessing step for the sensor fusion, an incident angle calculation unit 52C (see FIG. 4), which will be described later, uses, for example, an inverse matrix of the Kalman filter to convert the acceleration sensor of the vehicle (based on the Cartesian coordinates on the global coordinate system) inversely to the sensor coordinate system. Furthermore, the incident angle calculation unit 52C may subtract the inversely converted detection values from the values of the three orthogonal axes of the acceleration sensor 38F.

Figure 4:
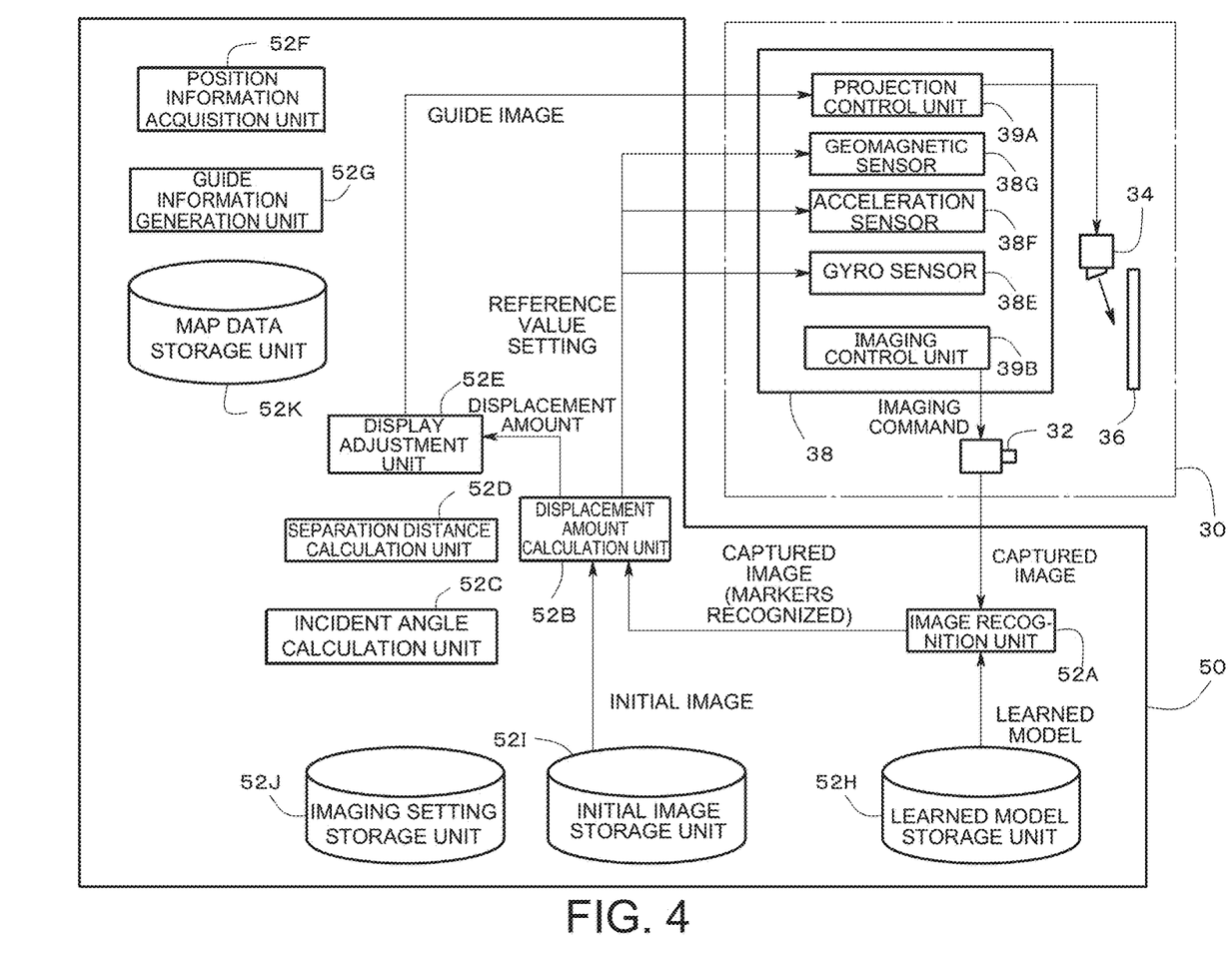
FIG. 4 illustrates functional blocks of the image display system according to the embodiment in which processing details of each block at initial settings are illustrated.

By the CPU 38A executing the initial setting program and the AR image display program stored in the storage 38C, the functional blocks illustrated in FIG. 4 are generated in the controller 38. These functional blocks include a projection control unit 39A and an imaging control unit 39B. Data processing details of these blocks will be described later.

<Driving Assistance ECU>

The driving assistance ECU 50, which is the control unit of the image display system, uses the image captured by the imager 32 to determine the position and size of the AR image to be projected to the half mirror 36. The driving assistance ECU 50 is an on-board electronic control unit. The driving assistance ECU 50 consists of, for example, a computer device.

As will be described later, the driving assistance ECU 50 has a navigation function to the destination. In addition, the driving assistance ECU 50 has a so-called advanced driving assistant system (ADAS) function that sounds an alarm when the vehicle deviates from its lane, displays traffic signs as AR images, or the like.

FIG. 3 illustrates a hardware configuration of the driving assistance ECU 50. The driving assistance ECU 50 includes a CPU 50A, an I/O controller 50B, a storage 50C, a system memory 50D, a graphics processing unit (GPU) 50E, a frame memory 50F, and a global navigation satellite system (GNSS) 50G. In the following, the hardware components with the same names as those of the controller 38 of the AR glasses 30 are omitted from the description as appropriate.

The GPU 50E is a computing device for image processing, and is mainly used to perform image recognition as will be described later. The frame memory 50F is a storage device that stores images captured by the imager 32 and processed by the GPU 50E.

The GNSS 50G is a positioning system that uses satellites, such as the global positioning system (GPS). The GNSS 50G receives position coordinate information including latitude, longitude, and altitude from satellites.

By the CPU 50A executing the initial setting program and the AR image display program stored in the storage 50C, the functional blocks illustrated in FIG. 4 are generated in the driving assistance ECU 50. The driving assistance ECU 50 includes, as the functional blocks having information processing functions, an image recognition unit 52A, a displacement amount calculation unit 52B, the incident angle calculation unit 52C, a separation distance calculation unit 52D, a display adjustment unit 52E, a position information acquisition unit 52F, and a guide information generation unit 52G. The processing details of these functional blocks will be described later.

The driving assistance ECU 50 also includes, as storage units, a learned model storage unit 52H, an initial image storage unit 52I, an imaging setting storage unit 52J, and a map data storage unit 52K. The learned model storage unit 52H stores a learned model for image recognition of the first marker 10 and the second marker 12. For example, a convolutional neural network (CNN) is implemented as the learned model in the learned model storage unit 52H. This neural network learns using, for example, a plurality of pieces of training data that use the images of the first marker 10 as input images and provide the marker labeled "first marker" as the output label, and a plurality of pieces of training data that use the images of the second marker 12 as input images and provide the marker labeled "second marker" as the output label.

The initial image storage unit 52I stores initial image data that can be captured by the imager 32. A reference plane S (see FIG. 9) of the imager 32 is used to describe the initial image. The reference plane S is a plane with the optical axis L0 as the vertical axis and the axis orthogonal to the optical axis L0 as the horizontal axis.

Figure 8:
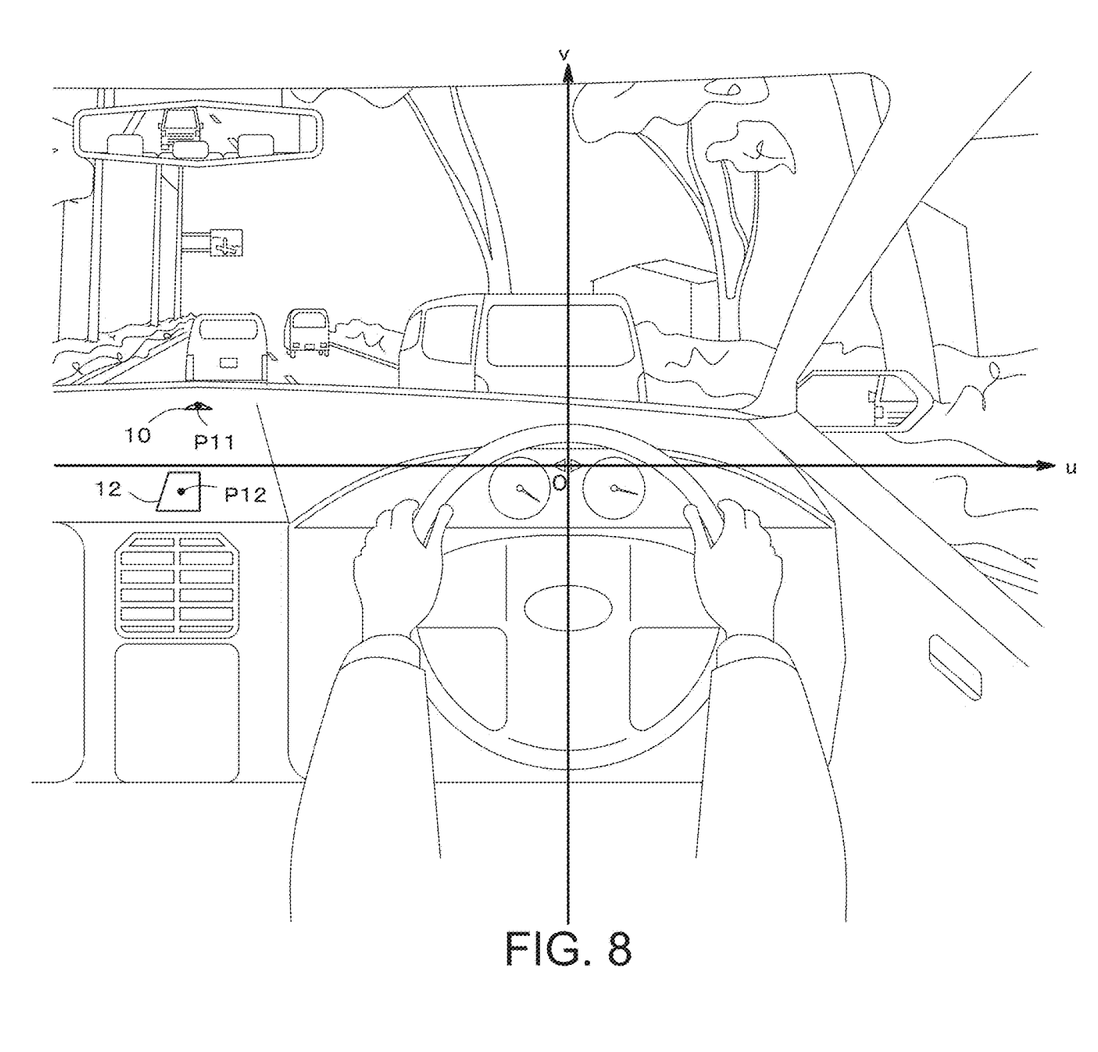
FIG. 8 illustrates an image captured by an imager on which image plane coordinates are superimposed.
Figure 9:
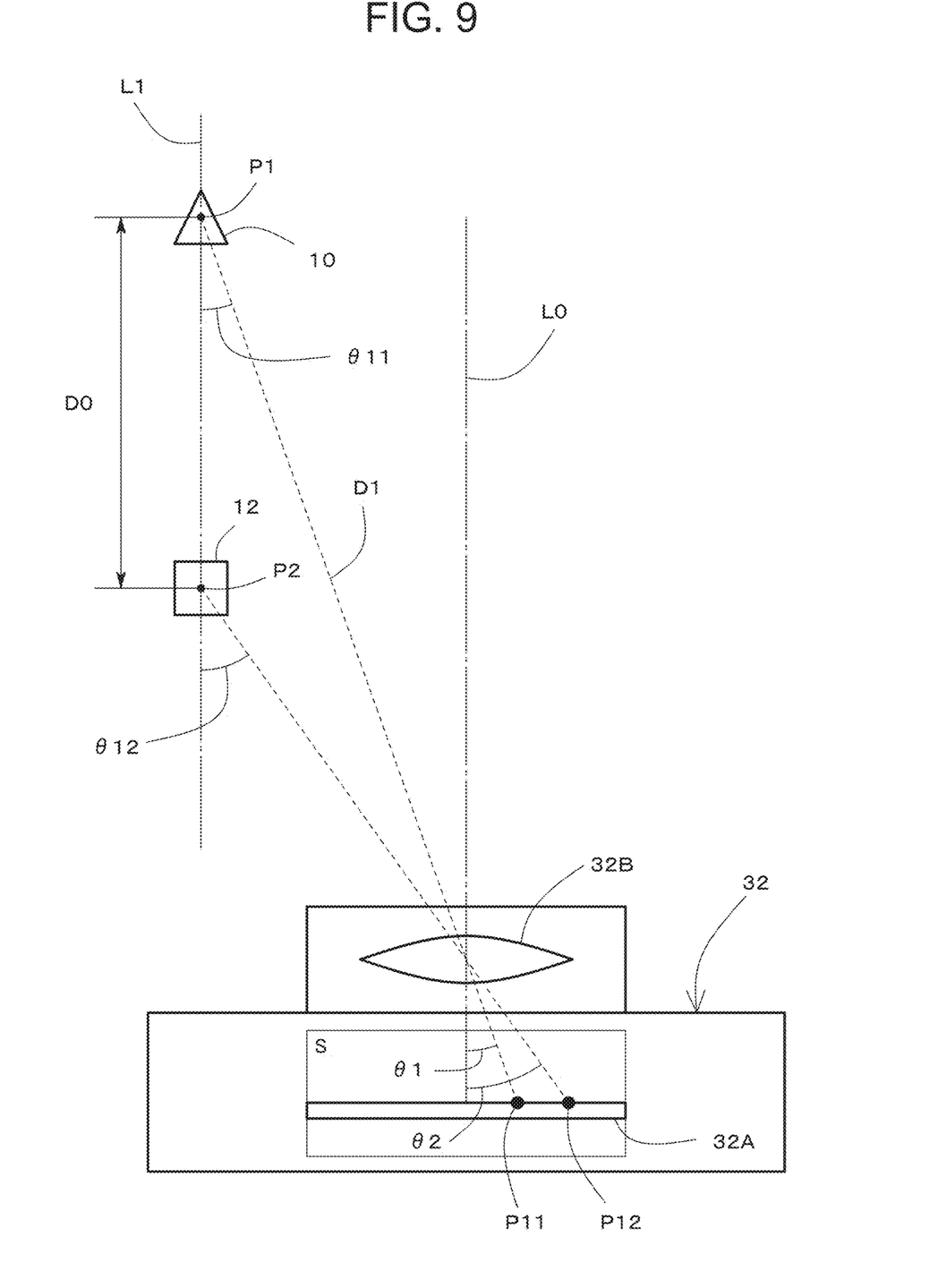
FIG. 9 is a view for explaining a calculation process of a camera-to-marker distance by the triangulation method.

As illustrated in FIG. 9, the initial image is the image captured by the imager 32 in the state (initial state) where the reference plane S is parallel to the horizontal plane and the optical axis L0 is parallel to the reference line L1. The initial image data are superimposed with the coordinate information of the contour lines of the first marker 10 and the second marker 12 (for example, coordinate point information on the u- and v-axes coordinates as illustrated in FIG. 8).

Referring to FIG. 4, the imaging setting storage unit 52J stores the imaging setting information of the imager 32. The imaging setting information includes information on the angle of incidence of each pixel in the pixel array 32A relative to the optical axis L0.

As illustrated in FIG. 9, real-world light enters each pixel on the pixel array 32A at a predetermined angle of incidence relative to the optical axis L0. Therefore, there is a one-to-one relationship between the position of a pixel on the pixel array 32A and the angle of incidence of light incident on that pixel. For example, the imaging setting storage unit 52J stores information on the correspondence between the focal length of the imager 32 and the corresponding pixel position and angle of incidence.

Figure 10:
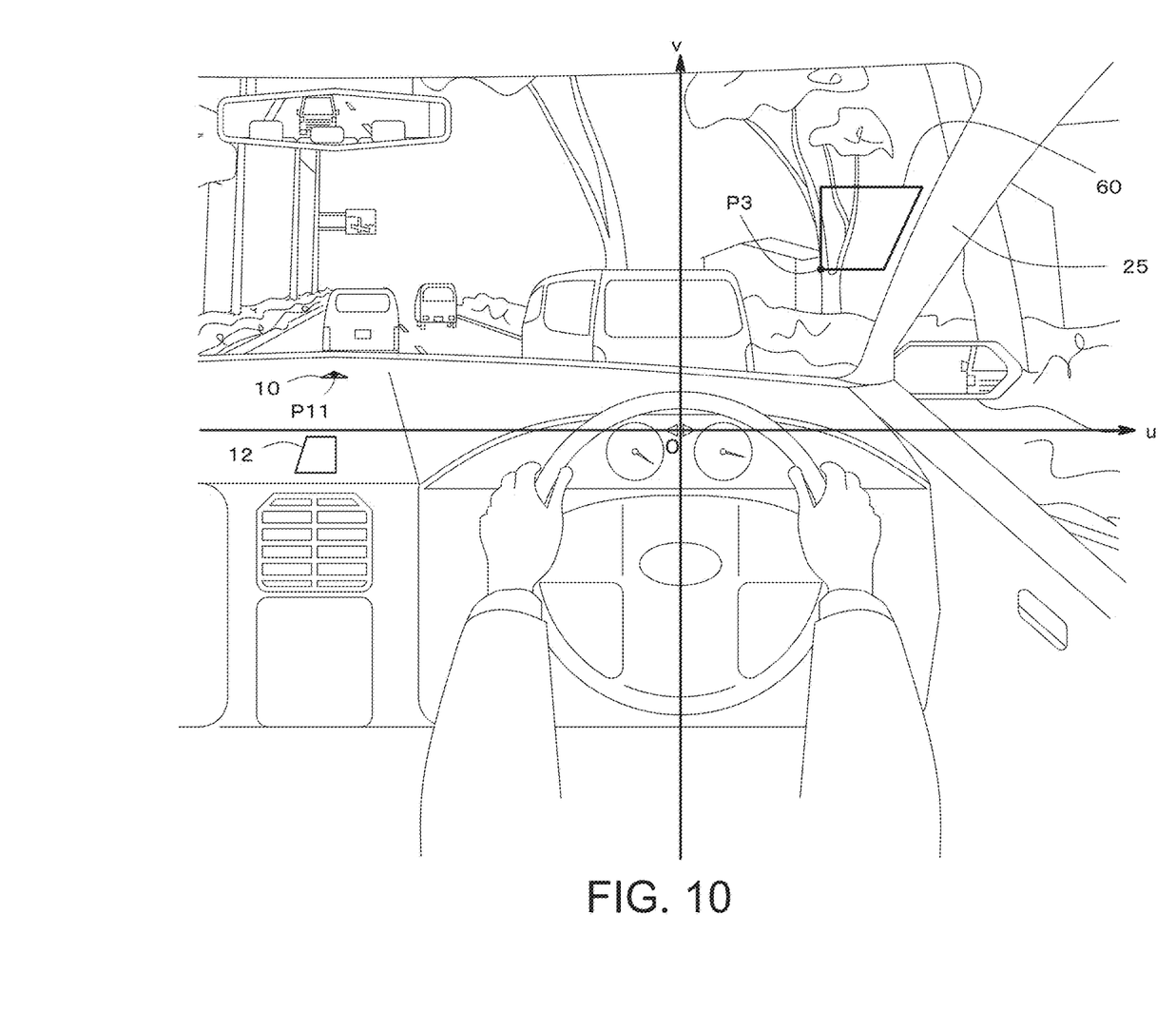
FIG. 10 is a view for explaining the arrangement of an image display frame on the image plane coordinates of a captured image.

The imaging setting storage unit 52J also stores reference values (image display reference values) of the projection position and size of the AR image with respect to the first marker 10. For example, as shown in FIG. 10, the image display frame 60 is set in the image plane. The image display frame 60 represents the display frame of the AR image. The size of this image display frame 60, such as the angle and length information of the top, bottom, right, and left edges, and the area information are stored in the imaging setting storage unit 52J.

Furthermore, the coordinates of P3, which is the lower end of the inner side of the vehicle width direction of the image display frame 60, are determined with respect to the center point P11 on the image plane of the first marker 10. For example, the lower end of the inner side of the vehicle width direction P3 is positioned at the coordinates ($u_{11}+\Delta u$, $v_{11}+\Delta v$) which are separated from the center point P11 by $\Delta u$, $\Delta v$, respectively. This displacement information from the center point P11 is stored in the imaging setting storage unit 52J.

The map data storage unit 52K stores map data that is based on a geographic coordinate system including latitude and longitude. The map data storage unit 52K also stores position information (latitude and longitude) of the destination set by the driver 100 or the like.

<Initial Setting Process>

Figure 5:
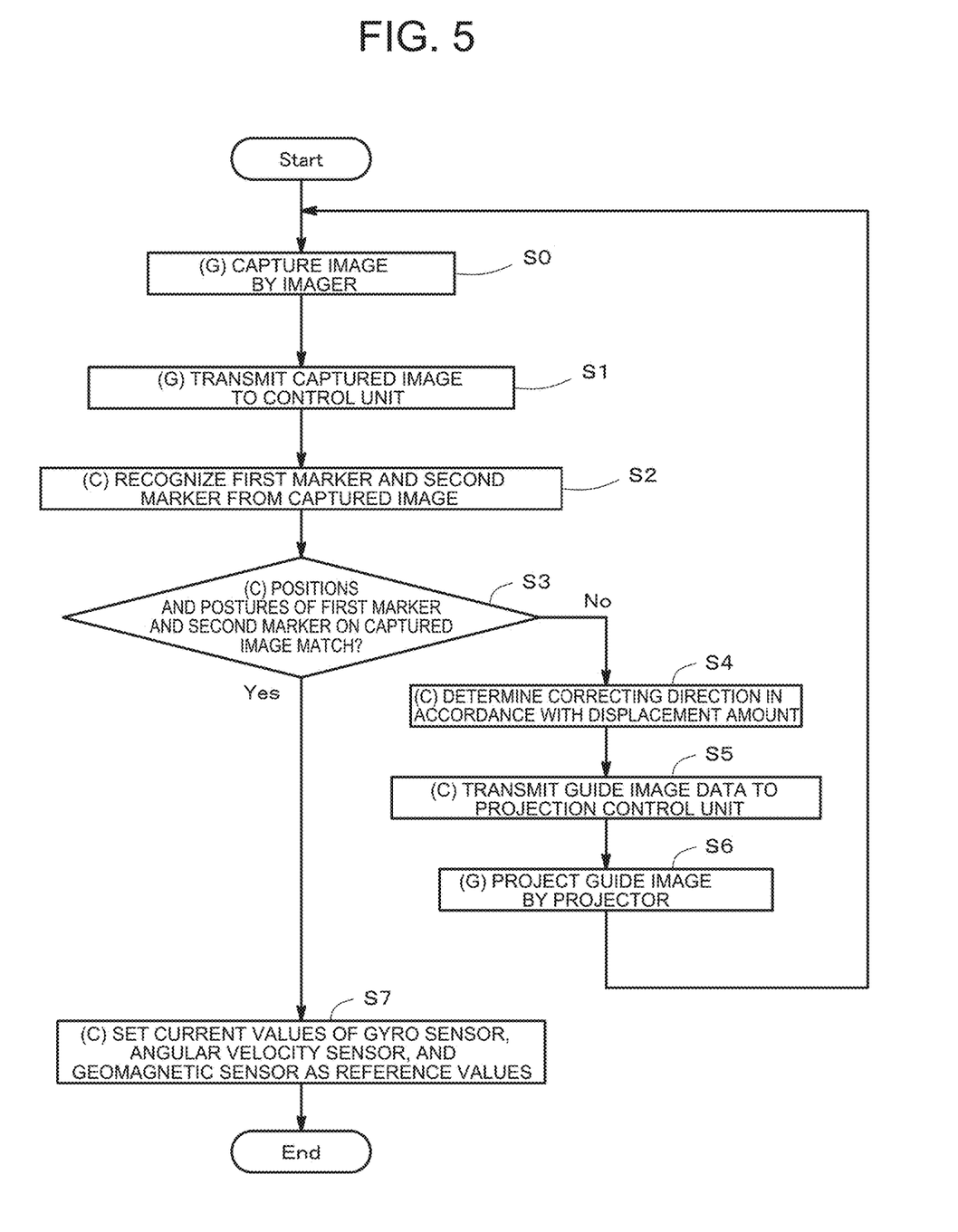
FIG. 5 is a flowchart illustrating an initial setting process.

FIG. 5 is a flowchart of the initial setting process by the image display system according to the present embodiment. In this initial setting process, the AR glasses 30 are positioned so that the reference plane S of the imager 32 is in the initial state illustrated in FIG. 9, and the detected values of the gyro sensor 38E, the acceleration sensor 38F, and the geomagnetic sensor 38G at that time are set to the reference values.

The initial setting process of FIG. 5 and the AR image display process of FIG. 7 indicate the entities executing each step, in which (G) indicates the processing by the AR glasses 30, and (C) indicates the processing by the driving assistance ECU 50.

The initial setting process is executed before the vehicle is driven. For example, when the vehicle is started and the navigation function is activated, the driving assistance ECU 50 asks the driver 100 as to whether the AR glasses 30 are used. For example, as illustrated in FIG. 1, a screen indicating whether the AR glasses 30 are used is displayed on an instrument panel display 28.

When the driver 100 wears the AR glasses 30 and presses down (taps) a button icon such as "Yes" displayed on the instrument panel display 28, the AR glasses 30 are connected to and establish communication with the driving assistance ECU 50.

Referring to FIGS. 4 and 5, the imaging control unit 39B of the controller 38 of the AR glasses 30 outputs an imaging command to the imager 32. When the imager 32 captures an image along the line of sight of the driver 100 (S0), captured image data are transmitted to the image recognition unit 52A of the driving assistance ECU 50 (S1).

The image recognition unit 52A calls a learned model (for example, the neural network) from the learned model storage unit 52H to recognize the first marker 10 and the second marker 12 in the received captured image (S2). The image recognition unit 52A transmits, to the displacement amount calculation unit 52B, the captured image data superimposed with the coordinate information of the contour lines of the first marker 10 and the second marker 12 (for example, the coordinate point information on the u- and v-axes coordinates illustrated in FIG. 8) of the image plane coordinates.

The displacement amount calculation unit 52B compares the captured image data with the initial image data stored in the initial image storage unit 52I to determine whether the position and posture of the first marker 10 and the second marker 12 in both images match (S3).

If at least one of the first marker 10 and the second marker 12 is displaced, the reference plane S of the imager 32 (see FIG. 9) takes a different position and posture from the initial state illustrated in the same figure. Therefore, the displacement amount calculation unit 52B calculates the amount of displacement of the first marker 10 and the second marker 12 between the initial image data and the captured image data, and determines the correction direction to eliminate the displacement (S4).

The calculated displacement amount is transmitted to the display adjustment unit 52E. The display adjustment unit 52E generates a guide image in accordance with the displacement amount. For example, the image data showing the first marker 10 and the second marker 12 in the initial state is generated. The display adjustment unit 52E transmits the generated guide image data to the projection control unit 39A (S5).

When the projection control unit 39A receives the guide image data, the projector 34 projects the guide image data (S6). For example, the projector 34 projects the guide image onto the half mirror 36. After that, the process returns to step S0, and the image capture by the imager 32 is performed again. In the image capture this time, the projection of the guide image may be interrupted.

On the other hand, if the positions of the first marker 10 and the second marker 12 match in the captured image and the initial image in step S3, the displacement amount calculation unit 52B sets the current values of the gyro sensor 38E, the acceleration sensor 38F, and the geomagnetic sensor 38G; that is, the values when the reference plane S is in its initial state, as the reference values (S7). The set reference values are stored in the initial image storage unit 52I. Thus, the initial settings of the imager 32 are completed as described above, and the AR image display process illustrated in FIG. 7 is ready to be executed.

<AR Image Display Process>

In the AR image display flow for the image display system according to the present embodiment, a navigation image, for example, is projected on the AR glasses 30 as the AR image. In the AR technology that superimposes virtual images on the real world, the 3D coordinates of the real world are mapped to the image plane coordinates. This correspondence is also called a 2D-3D correspondence.

As the 2D-3D correspondence, for example, each coordinate point of 3D coordinates in the real world is mapped to the corresponding coordinate point of its image plane coordinates. Such correspondence uses, for example, a so-called PnP position and posture estimation that requires an excessive computational load.

Here, the driver 100 basically sets his/her line of sight in the forward direction of travel while driving, and the amount of displacement from that point is small compared to, for example, the amount of displacement of the line of sight of a pedestrian. In other words, projecting the AR images to the driver 100 can be considered similar to, for example, captioning on a movie screen. Therefore, in the AR image display process described below, a coarse correspondence, so to say, is performed in a less computationally demanding manner without taking a strict 2D-3D correspondence as in the PnP position and posture estimation described above.

Figure 6:
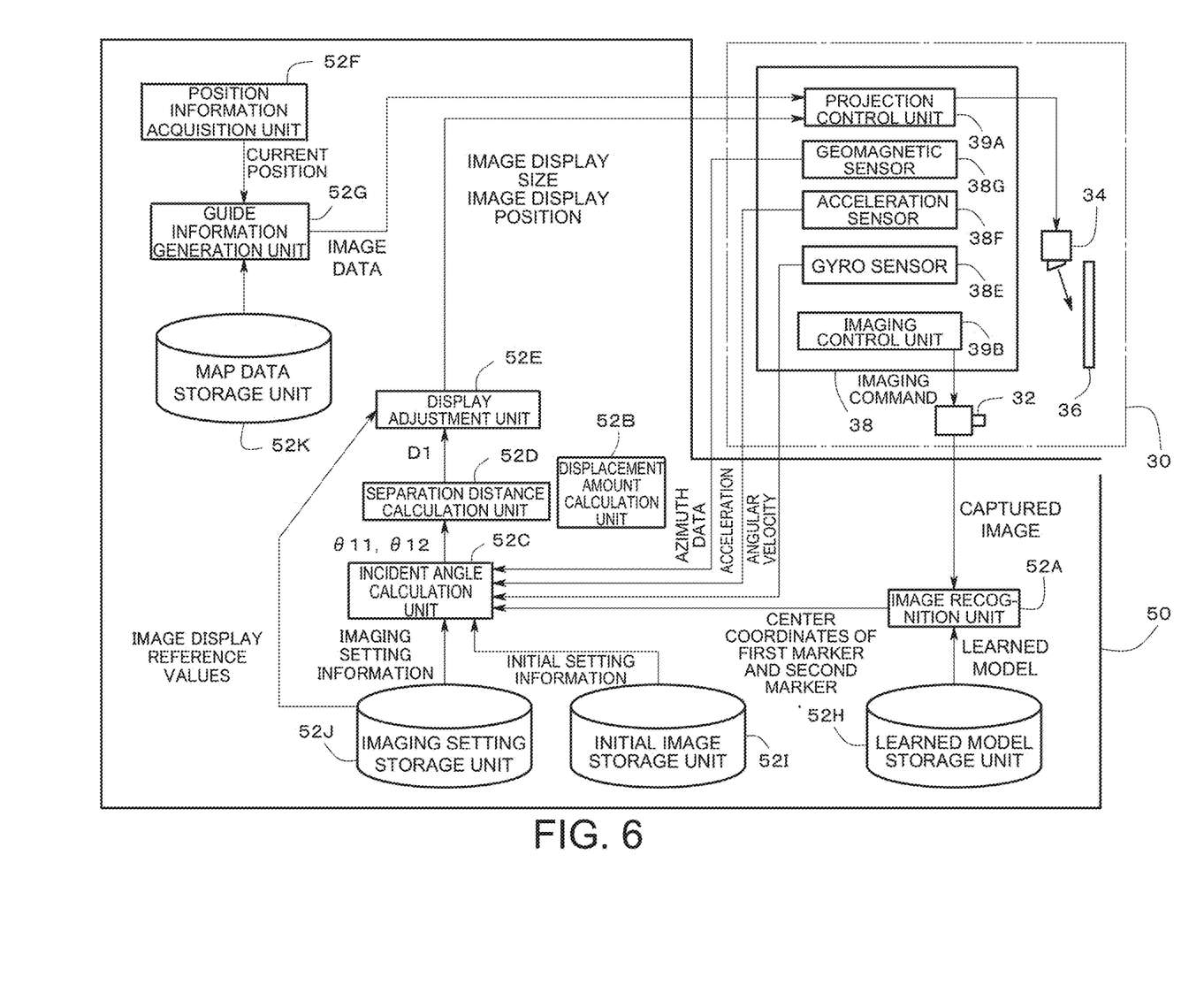
FIG. 6 illustrates functional blocks of the image display system according to the embodiment in which processing details of each block in executing the AR image display process are illustrated.

Referring to FIGS. 6 and 7, the imaging control unit 39B outputs an image capture command to the imager 32. In response, the imager 32 captures a real-world image along the line of sight of the driver 100. The image data captured by the imager 32 is transmitted to the image recognition unit 52A (S10).

The image recognition unit 52A calls a learned model (for example, the neural network) from the learned model storage unit 52H to recognize the first marker 10 and the second 12 marker in the captured image (S12).

Furthermore, the image recognition unit 52A determines the coordinates of the centers of the first marker 10 and the second marker 12 in the image plane (S14). For example, as illustrated in FIG. 8, the captured image data are processed as data on the image plane with the v-axis as the vertical axis and the u-axis as the horizontal axis. For example, the optical axis L0 (see FIG. 9) passes through the origin and extends vertically through the image plane.

Referring to FIG. 9, the center points P11 and P12 of the first marker 10 and the second marker 12, respectively, on the image plane, or on the pixel array 32A, are obtained as coordinate points on the uv plane. The scale on the u- and v-axes (one tick mark) may represent, for example, the horizontal and vertical dimensions, respectively, of each pixel.

The coordinate data of the center points P11 and P12 on the pixel array 32A of the first marker 10 and the second marker 12, respectively, are transmitted to the incident angle calculation unit 52C. In addition, the rotation angle data at the time of the image capture from the gyro sensor 38E and the acceleration data at the time of the image capture from the acceleration sensor 38F are transmitted to the incident angle calculation unit 52C. As described above, these data are three-axis component data in the sensor coordinate system. The azimuth data at the time of the image capture from the geomagnetic sensor 38G are also transmitted to the incident angle calculation unit 52C.

In accordance with the u-axis component of the center point P11 of the first marker 10 on the pixel array 32A, the incident angle calculation unit 52C calculates the angle of incidence $\theta 1$ relative to the optical axis L0 when the light from the center point P1 of the first marker 10 in the real world is incident on the pixel P11 in plan view as illustrated in FIG. 9 (S16).

As mentioned above, the pixels (or more precisely, the positions of the pixels) on the pixel array 32A correspond one-to-one to the angles of incidence relative to the optical axis L0. Such correspondence between pixels and incident angles is stored in the imaging setting storage unit 52J in tabular form, for example. The incident angle calculation unit 52C calculates the incident angle $\theta 1$ corresponding to the u-axis component of the center point P11 on the pixel array 32A by referring to the above correspondence stored in the imaging setting storage unit 52J.

FIG. 9 illustrates the case in which the reference plane S of the imager 32 is in the initial state, and in this case, the angle of incidence $\theta 1$ relative to the optical axis L0 is equal to the angle of incidence $\theta 11$ (first angle of incidence) of the first marker 10 relative to the reference line L1. On the other hand, depending on the position and posture of the driver 100, the reference plane S may be displaced from its initial state. This tilt is detected by the incident angle calculation unit 52C in accordance with the respective detection values of the gyro sensor 38E, the acceleration sensor 38F, and the geomagnetic sensor 38G, and the first angle of incidence $\theta 11$ is obtained in accordance with the detection results (S17).

For example, as described above, the orthogonal three axis components (roll, pitch, and yaw) of the sensor coordinate system of the gyro sensor 38E and the orthogonal three axis components (X-, Y-, and Z-axes components) of the sensor coordinate system of the acceleration sensor 38F are converted to various values in the global coordinate system using the known Kalman filter and the azimuth detection value obtained by the geomagnetic sensor 38G.

Furthermore, in accordance with the converted yaw angle, the tilt $\Delta\theta$ of the optical axis L0 illustrated in FIG. 9 relative to the reference line L1 is obtained. For example, if the optical axis L0 is tilted counterclockwise in FIG. 9, the angle of incidence $\theta 1$ minus the tilt $\Delta\theta$ is the angle of incidence $\theta 11$. If the optical axis L0 is tilted clockwise, the angle of incidence $\theta 1$ plus the tilt $\Delta\theta$ is the angle of incidence $\theta 11$.

Furthermore, in accordance with the u-axis component of the center point P12 of the second marker 12 on the pixel array 32A, the incident angle calculation unit 52C calculates the angle of incidence $\theta 2$ relative to the optical axis L0 when the light from the center point P2 of the second marker 12 in the real world is incident on the pixel P12 in plan view as illustrated in FIG. 9 (S18). At this time, if there is any displacement of the reference plane S from its initial state as described above, the angle of incidence $\theta 2$ is corrected for the displacement, and the angle of incidence $\theta 12$ (second angle of incidence) of the second marker 12 relative to the reference line L1 is obtained (S19).

The calculated data of the first angle of incidence $\theta 11$ and the second angle of incidence $\theta 12$ are transmitted to the separation distance calculation unit 52D. In accordance with the incident angles $\theta 11$, $\theta 12$ and the known separation distance DO (inter-marker separation distance) of the first and second markers 10 and 12, the separation distance calculation unit 52D determines the separation distance D1 between the imager 32 (more specifically, the center point P11 on the pixel array 32A) and the center point P1 of the first marker 10 in the real world (S20).

The determination of the separation distance D1 in accordance with the incident angles $\theta 11$, $\theta 12$ and the separation distance DO is performed, for example, according to the triangulation method using the sine theorem. The sine theorem and the triangulation method are known techniques and are not described here.

The calculated separation distance D1 is transmitted to the display adjustment unit 52E. As described above, the display adjustment unit 52E calls from the imaging setting storage unit 52J the image display reference values in accordance with the u, v coordinates of the center point P11 of the first marker 10 on the image plane (S22). The image display reference values include the size information and the reference value of the position of the bottom edge P3 on the image plane of the image display frame 60 (see FIG. 10). As mentioned above, the reference value of the projection position is indicated, for example, as $(u_{11}+\Delta u, v_{11}+\Delta v)$ using the displacement amounts $\Delta u$, $\Delta v$ with respect to the $u_{11}$, $v_{11}$ coordinates of the center point P11.

The display adjustment unit 52E modifies the image display position in accordance with the separation distance D1 (S24). For example, when the separation distance D1 is relatively long, the displacement amounts $\Delta u$, $\Delta v$ are modified to be closer to the center point P11 (see FIG. 10) than those of the image display reference values.

The display adjustment unit 52E also modifies the image display size in accordance with the separation distance D1 (S26). For example, when the separation distance D1 is relatively long, the size information is modified so that the area of the image display frame 60 (see FIG. 10) is smaller than that of the image display reference values.

Subsequently, the display adjustment unit 52E transmits the modified image display position $(u_{11}+\Delta u', v_{11}+\Delta v')$ and the size information of the image display frame 60 to the projection control unit 39A of the AR glasses 30 (S28).

At the same time, the guide information generation unit 52G generates the image data to be projected as the AR image. For example, the guide information generation unit 52G generates the image data for route guide in accordance with the destination and map data stored in the map data storage unit 52K and the current position of the own vehicle obtained from the position information acquisition unit 52F. The generated image data are transmitted to the projection control unit 39A of the AR glasses 30 (S28).

The projection control unit 39A controls the projector 34 to project the AR image 62 onto the half mirror 36 in accordance with the size of the image display frame 60 on the image plane and the position of the bottom edge P3, as illustrated in FIGS. 10 and 11 (S30). For example, the projection control unit 39A stores the projection angle corresponding to the image plane coordinates and, accordingly, controls the projection of the projector 34. As a result, as illustrated in FIG. 11, the AR image 62 showing the route guide is displayed in the field of view of the driver 100. Furthermore, the process is re-executed depending on, for example, the number of clocks of the GPU 50E (see FIG. 3).

Thus, the image display system according to the present embodiment adjusts the projection position and size of the AR image 62 in accordance with the separation distance between the driver 100 and the first marker 10. The projection position and size of the AR image 62 changes according to the position and posture of the driver 100, so that the setting accuracy of the projection position and size of the AR image can be improved.

In the embodiment described above, only the first marker 10 and the second marker 12 are attached to the top surface 20A of the instrument panel 20, but more markers may be provided. In that case, the triangulation can be performed between the imager 32 and any two markers in multiple patterns, and as a result, the distance between the imager 32 and each marker can be determined more accurately.

The present disclosure is not limited to the present embodiments described above, and includes all changes and modifications without departing from the technical scope or the essence of the present disclosure defined by the claims.

The invention claimed is:

1. An image display system, comprising:
augmented reality (AR) glasses including an imager that captures an image along the line of sight of a driver who is a wearer, a projector that projects an AR image, and a half mirror onto which the AR image is projected;
a control unit that determines a projection position and size of the AR image onto the half mirror in accordance with the image captured by the imager; and
markers provided in a vehicle cabin, wherein
the markers includes a first marker and a second marker provided on an exposed interior surface in front of a vehicle cabin and spaced apart from each other along a predetermined reference line, and the control unit includes
- an incident angle calculation unit that calculates a first angle of incidence which is an angle of incidence of the first marker to the imager relative to the reference line in the real world, and a second angle of incidence which is an angle of incidence of the second marker to the imager relative to the reference line in the real world, in accordance with image plane coordinates of the first marker and the second marker in the image taken by the imager,
- a separation distance calculation unit that calculates a camera-to-marker distance which is a distance from the imager to the first marker, in accordance with the calculated first and second angles of incidence, and an inter-marker separation distance between the first marker and the second marker along the reference line in the real world, and
- a display adjustment unit that adjusts the projection position of the AR image and the size of the AR image with respect to the first marker in the image plane coordinates in accordance with the camera-to-marker distance.

2. The image display system according to claim 1, wherein
the first marker and the second marker are luminescent members.

3. The image display system according to claim 2, wherein
the first marker and the second marker differ in shape from each other.

4. The image display system according to claim 3, wherein
the first marker and the second marker are arranged in the center of a width direction and in a front-rear direction of a vehicle on an exposed surface of an instrument panel of the vehicle.

5. The image display system according to claim 4, wherein
the first marker is located further forward of the vehicle than is the second marker, and
the area of the first marker is less than or equal to the area of the second marker.

* * * * *